(12) United States Patent
Moore et al.

(10) Patent No.: US 6,211,679 B1
(45) Date of Patent: Apr. 3, 2001

(54) METHOD OF COMPENSATING LATERLOG MEASUREMENTS FOR PERTURBATION OF SURVEY VOLTAGE BY CABLE ARMOR VOLTAGE

(75) Inventors: Robert A. Moore, Katy; Horacio A. Zea, Houston, both of TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/131,975

(22) Filed: Aug. 11, 1998

(51) Int. Cl.[7] .................................................. G01V 3/18

(52) U.S. Cl. ............................................................ 324/366

(58) Field of Search .................................... 324/366, 368, 324/369, 371, 370, 373, 375

(56) References Cited

U.S. PATENT DOCUMENTS 4,335,353 * 6/1982 Lacour-Gayet ...................... 324/366

* cited by examiner

*Primary Examiner*—Jay Patidar
(74) *Attorney, Agent, or Firm*—Conley, Rose & Tayon, P.C.

(57) ABSTRACT

A method and apparatus are disclosed for correcting erroneous downhole resistivity measurements. In particular, capacitive coupling downhole leads to erroneous resistivity readings. The invention compensates for such coupling by measuring a survey voltage between the resistivity tool voltage and a reference voltage on the wireline cable. A correction voltage is measured between a point on the armor around the wireline cable and the reference voltage. The characteristics of a transmission wireline used at a specific site are measured and are combined with the measured downhole correction voltage and survey voltage to determine more accurately formation resistivity.

12 Claims, 3 Drawing Sheets

METHOD OF COMPENSATING LATERLOG MEASUREMENTS FOR PERTURBATION OF SURVEY VOLTAGE BY CABLE ARMOR VOLTAGE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to wellbore resistivity measurements. More particularly, the present invention relates to correcting erroneous downhole resistivity measurements.

2. Description of the Related Art

Modem petroleum drilling and production operations demand a great quantity of information relating to parameters and conditions down hole. Such information typically includes characteristics of the earth formations traversed by the wellbore, in addition to data relating to the size and configuration of the bore hole itself. The collection of information relating to conditions down hole commonly is referred to as "logging." Logging has been known in the industry for many years as a technique for providing information regarding the particular earth formation being drilled and can be performed by several methods. In conventional oil well wire line logging, a probe or "sonde" is lowered into the borehole after some or all of the well has been drilled, and is used to determine certain characteristics of the formations traversed by the borehole. A wireline sonde may include a source device for transmitting energy into the formation, and one or more receivers for detecting the energy reflected from the formation. The sonde typically is constructed as a hermetically sealed cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface and to control signals from the surface to the sonde. In accordance with conventional techniques, various parameters of the earth's formations are measured and correlated with the position of the sonde in the borehole, as the sonde is pulled uphole.

One concern for every downhole tool is the accuracy of its measurements. For example, in the prior art, real world constraints have limited the accuracy, and hence the reliability, of downhole resistivity tools. Referring now to FIG. 1, a wellbore 100 in formation 105 surrounds downhole current supply electrodes on resistivity tool 110. Formation 105 may contain high resistivity portion 150 and low resistivity portion 155. Also shown are return B-electrode 120, reference N-electrode 125, and comparator 130. Tool 110 provides electrical current 140 to formation 105. Current 140 flows to return B-electrode 120. Comparator 130, attached to tool 110 and N-electrode 125, measures the potential drop between the tool 110 and the N-electrode 125. The resistivity of the formation 105 may then be calculated based upon this measured voltage differential at comparator 130.

Nonetheless, a calculated resistivity based upon the assembly of FIG. 1 may be inaccurate, particularly when it occupies a formation with low and high resistivity strata. More particularly, measurements between resistivity tool 110 and the N-electrode 125 should ideally approximate the measurements between a resistivity tool 110 and infinity. However, when the N-electrode 125 and B-electrode 120 are spaced relatively near to one another, they interact and affect the voltage measurement at logging device 110. This interaction is particularly pronounced when the formation 150 surrounding the N-electrode 125 and B-electrode 120 has a high resistivity, whereas the formation 155 surrounding logging tool 110 has a low resistivity. The problem under these conditions is that the measured survey voltage from the tool is relatively low. However, there is a very high potential drop to the B-electrode from infinity due to its location in a high resistivity bed. Because the N-electrode is also surrounded by the high resistivity bed, the potential at the N-electrode approaches the potential at the B-electrode and thus a highly erroneous tool reading results. This effect often occurs in the Delaware basin in West Texas and as such is known as the Delaware effect. A similar phenomenon is called the Groningen effect so named after the Groningen formation in Holland.

One attempt to solve this problem in the prior art involved placing the B-electrode 120 at the surface (not shown). By placing the B-electrode 120 at the surface, it was thought that resistivity measurement problems would be solved because the B-electrode 120 would not be proximate to the very high resistive bed surrounding the N-electrode 125. However, this solution was not as effective as had been hoped, with substantial measurement error still present. Schlumberger attempted to correct these errors in their ARI-type laterolog tools. Such corrections are complicated, and are based on mathematical modeling. The correction factors often are dependent upon knowledge that is not known "a priori." For example, the bore hole diameter, and formation and mud resistivity upon the tool (which also must be measured as they are not known beforehand). Further, a system placing the B-electrode at the surface is complicated because placement of the B-electrode 120 on the surface requires control of the current supply at the surface.

An alternate and more successful approach to solving the Delaware effect problem was placement of the N-electrode 125 on the surface in a mud pit or some other location that gives a good electrical connection to the ground. This approach also separates the B-electrode from the N-electrode, and thus was expected to improve the downhole measurements of resistivity. It was also thought that such an approach would not require much of the complexity involved when placing the B-electrode on the surface. While this solution yields improved results over placing the B-electrode 120 on the surface, it still has certain drawbacks. These problems arise from the conductive cable armor that extends downhole and that supports and connects the down hole resistivity tool 110 and B-electrode 120 to the surface. Thus, interaction still occurs between the B-electrode 120 and N-electrode 125.

These and other problems exist in the prior art, and thus there is a need for a device or method to solve these problems.

SUMMARY OF THE INVENTION

The present invention features a method and apparatus to correct for severe resistivity measurement errors present in prior wellbore resistivity tools. In particular, one embodiment of the present invention features a downhole laterolog array and return electrode, in addition to two measurement amplifiers. The measurement amplifiers detect the voltage potential at the laterolog array with respect to a reference voltage, and the voltage potential at a point on a cable armor to which this embodiment is attached. These measurements can be used to determine more accurately the downhole resistivity based on a disclosed resistivity formula.

Another embodiment of the invention comprises a system including a downhole resistivity tool and a processor to compute the resistivity of a formation.

Another embodiment of the invention is a method for operating the disclosed wellbore resistivity tool and determining each tool's individual characteristic. This characteristic may then be used to estimate more accurately the resistivity of a downhole formation.

Thus, the present invention comprises a combination of features and advantages which enable it to overcome various problems of prior devices. The various characteristics described above will be readily apparent to those skilled in the art upon reading the following detailed description of the preferred embodiments of the invention, and by referring to the accompanying drawings. Additional features and advantages will be set forth in part in the description that follows, or may also be learned by practice of the invention.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1:
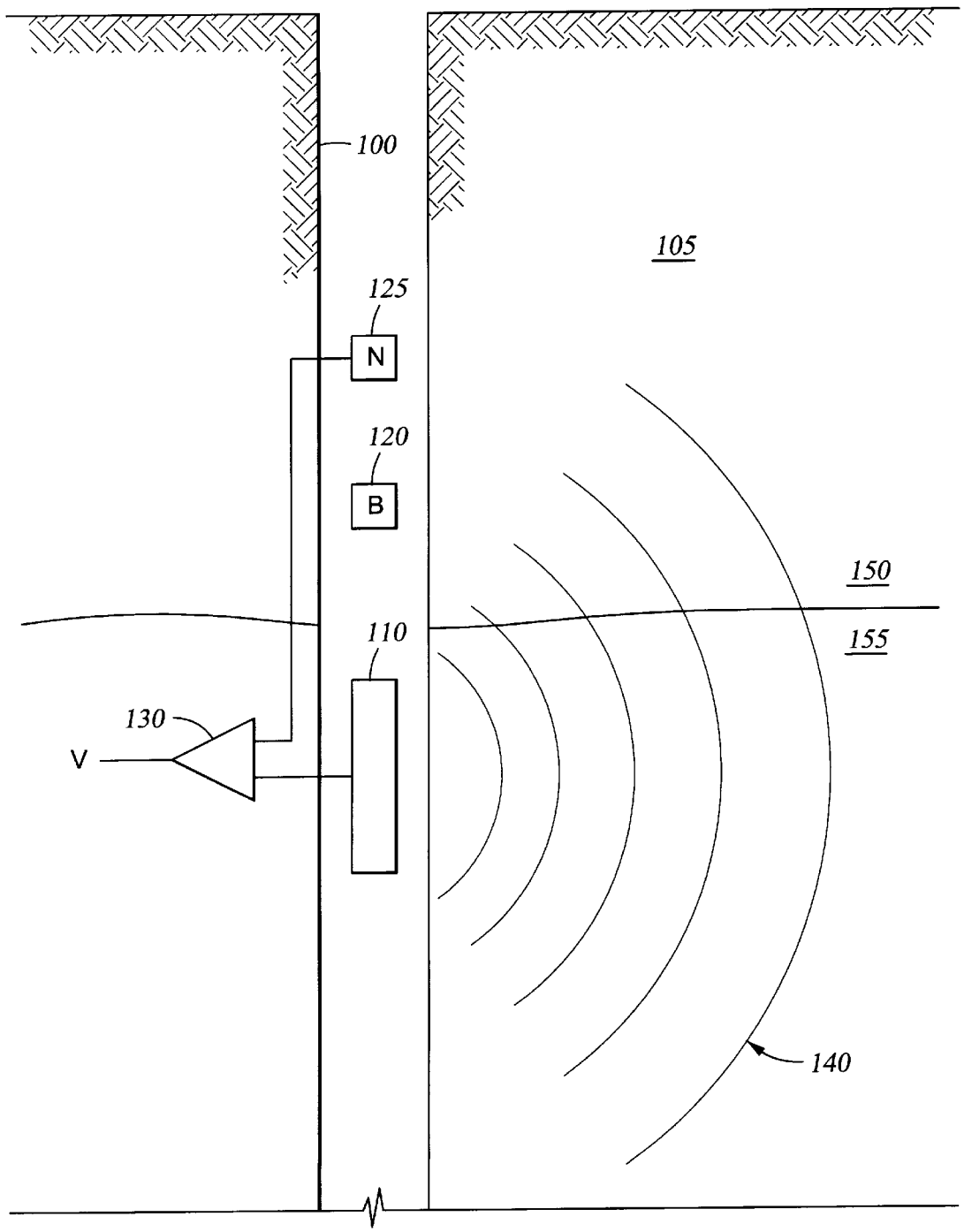
FIG. 1 is a prior art resistivity tool.
Figure 2:
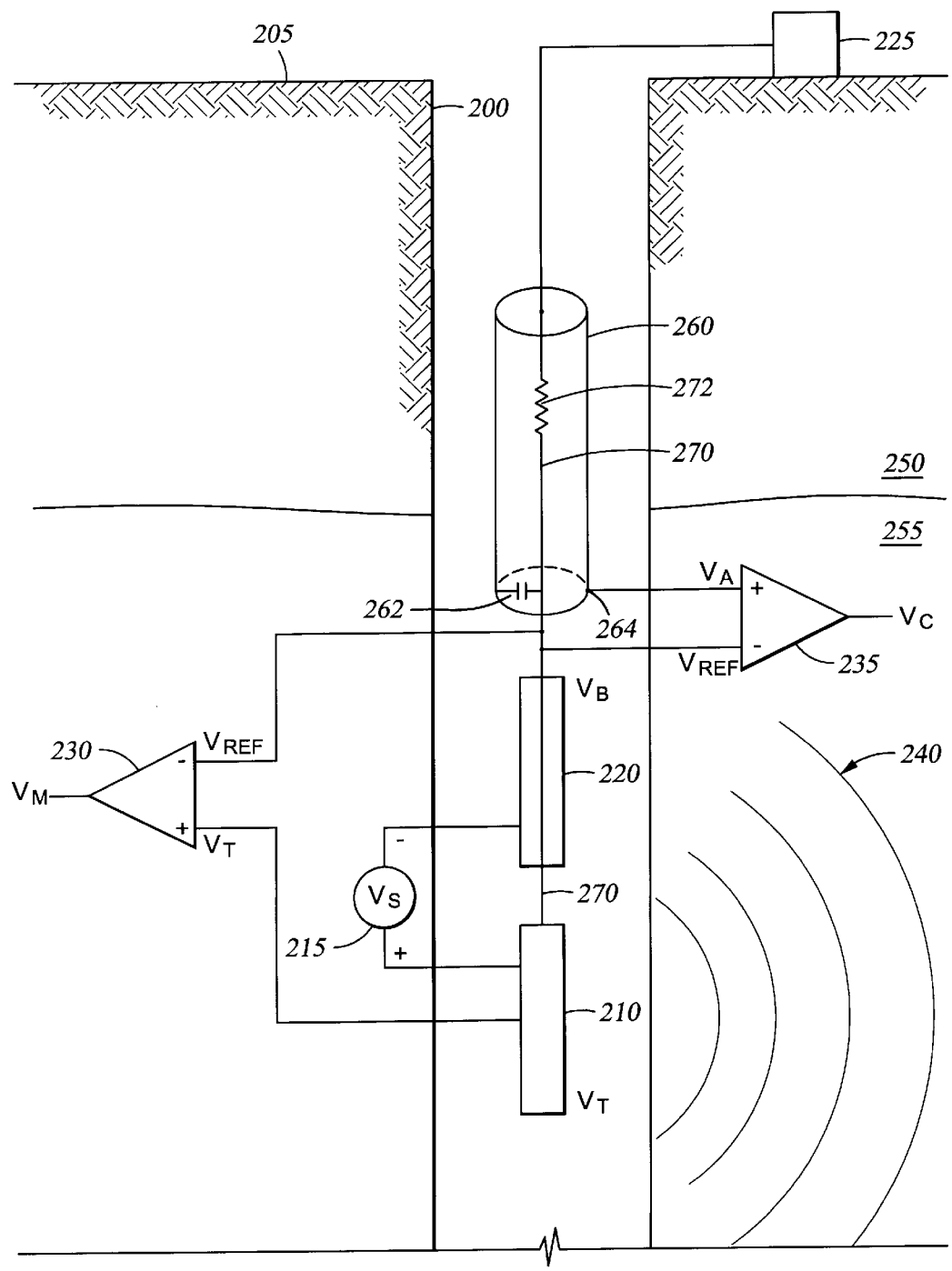
FIG. 2. is a resistivity tool built in accordance with the teachings of the present invention.

Referring now to FIG. 2, a bore hole 200 is drilled in the surface of the earth 205 and through high and low resistivity rock formations 250 and 255. An electric logging system according to a preferred embodiment of the present invention includes current supply electrodes of a laterolog array 210 that provide a survey current 240 having a magnitude of $i_0$. Laterolog array 210 connects via down hole AC power source 215 to B-electrode 220. A distance of about 30–45 feet separate laterolog array 210 and B-electrode 220. Connected to laterolog array 210 via a conventional conductor wire line 270 is also an N-electrode 225. N-electrode 225 resides in a mud pit (not shown) or other appropriate location on the surface of the earth 205. Wire line 270 has a resistance 272 and is surrounded by a conductive cable armor 260. As can be seen, cable armor 260 does not extend past B-electrode 220 and array 210. Instead, a non-conductive bridle (not shown) surrounds those elements. The bottom of the cable armor 260 defines point 264, the general location for the armor voltage, $V_A$. The area of wireline cable 270 at or near point 264 on armor 260 is the location for a reference voltage, $V_{Ref}$. The $V_{Ref}$ area on wireline cable 270 is about 30–45 feet from B-electrode 220. Comparator 230 measures the voltage difference between the tool voltage, $V_T$, and reference voltage $V_{Ref}$. Comparator 235 measures the voltage difference between the armor voltage $V_A$ and the reference voltage $V_{REF}$.

Figure 3:
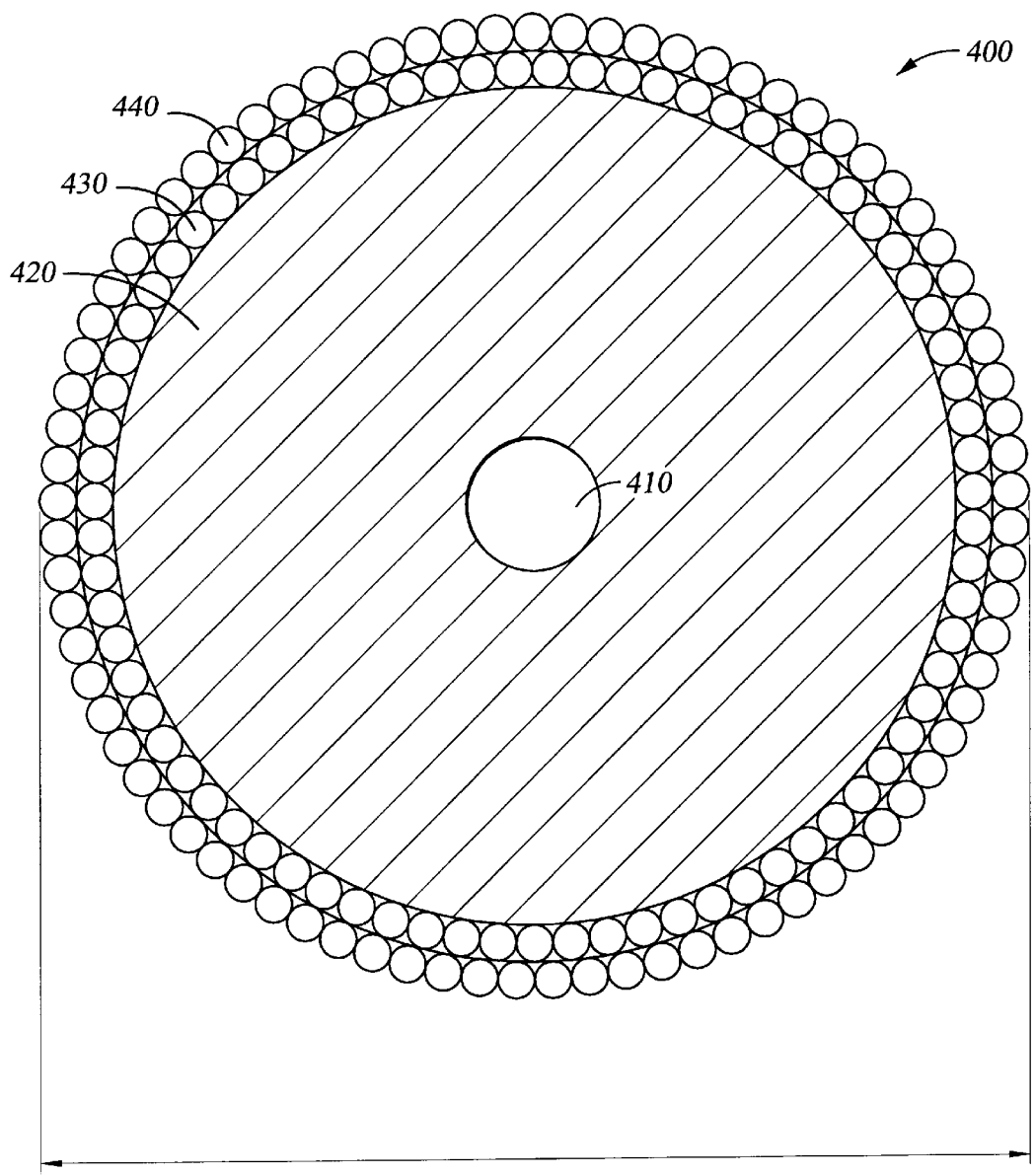
FIG. 3 is a wireline transmission and support line.

FIG. 3 illustrates a standard wireline cable appropriate for use as wireline cable 270. Wireline cable 400 includes a copper conductor 410 at the center of insulation 420 and first and second armored layers 430, 440 of strength member strands wound helicaly around the outer insular jacket in opposite directions. Such a standard electrical transmission line is conventionally about 0.55 centimeters wide. As will be appreciated, other transmission wires can also be appropriately used in conjunction with the teachings herein.

Referring back to FIG. 2, each bridle (not shown) surrounding B-electrode 220 and laterolog array 210 is a non-conductive insulating member that is wrapped with fiberglass and insulated from end to end. A first bridle physically separates the return electrode 220 and the armor 260 of transmission wireline 270. Similarly, a second bridle piece fits between the B-electrode 220 and the resistivity tool 210. Amplifiers 230 and 235 are preferably positioned in the resistivity tool.

Two types of coupling can interfere with an accurate reading of downhole resistivity and are particularly troublesome under the Delaware effect conditions described above. The first type of coupling is inductive coupling between the cable armor 260 and wireline 270. This type of coupling occurs when the B-electrode is placed on the surface as is known in the prior art. This inductive coupling is not seen when the N-electrode is placed on the surface, as can be shown from Maxwell's equation:

$$\oint H \cdot dl = I$$

When the N-electrode is on the surface, and the B-electrode is placed downhole, current flows along conductive armor 260 of wire line 270 to the N-electrode, but because there is no enclosed current there exists no magnetic field within the armor 260. Consequently, placing the N-electrode on the surface 205 (and placing the B-electrode 220 down hole) results in no inductive coupling between the cable armor and the wireline.

Capacitive coupling is a second type of coupling that interferes with down hole resistivity measurements, and particularly with measurements of $V_M$. $V_M$ is defined as the measured survey voltage between the downhole electrode array and the surface reference. That is, an armor voltage $V_A$ is present at the lower end 264 of armor 260 because cable armor 260 is not perfectly conductive. Consequently, capacitive coupling 262 results between the armor 260 and the wire line 270. As such, the voltage $V_A$, and the consequent capacitive coupling to the wireline conductor 270, makes a measurement of $V_{Ref}$ unreliable. Because an accurate reading of $V_T$, and hence formation resistivity, relies on $V_{Ref}$, the capacitive coupling 262 is undesirable. Under Delaware effect conditions, the magnitude of a resistivity error can easily exceed the magnitude of actual resistivity itself.

This capacitive coupling 262 may be minimized by (1) minimizing the conductor path resistance from the survey voltage amplifier input to the N-reference electrode 225; (2) using low-capacitance dielectric material between the armor 260 and wire line 270 to insulate the wire line conductors and armor from one another; or (3) maximizing the physical separation of the wire line conductor 270 from the armor 260. However, each of these approaches may be inconvenient because of the physical limits of the size and weight of the armored wire line cables and associated handling equipment. In addition, a specially manufactured wireline would increase costs, with conventional wireline thus being preferable.

Another possible solution is the measurement of $V_A$ at the lower end 264 of armor 260. This would allow computation of the magnitude of the perturbations to $V_{Ref}$. Such measurements of $V_A$, however, would be perturbed by the same mechanisms existing when measuring the tool voltage $V_T$ with respect to the surface reference electrode 225.

As such, some method or approach must determine a correction for the resistivity measurement without directly measuring $V_A$. In pursuit of this, a measurement amplifier 235 is connected to the wire line armor 260 at its lower end 264 and to that portion of the wire line 270 that extends down hole. This measurement amplifier 235 measures a correction voltage, $V_C$, between $V_A$ and $V_{Ref}$.

Ohms law teaches that resistance equals voltage divided by current. Similarly, resistivity may be determined by the equation:

$$\rho = K \frac{V_T}{i_0} \tag{1}$$

For FIG. 2 this ideal equation results in:

$$\rho_a = K \frac{V_T - V_{Ref}}{i_0} \tag{2}$$

This equation is an acceptable approximation when the $\|V_{Ref}\| << \|(V_T - V_{Ref})\|$, or $\|V_{Ref}\| << \|V_T\|$. $V_{Ref}$ and $V_C$ can be modeled according to the equations:

$$V_{Ref} = K_1 \cdot V_A \tag{3}$$

$$V_c = K_2 \cdot V_A \tag{4}$$

B substitution, it is known that:

$$V_{Ref} = \frac{K_1 V_c}{K_2} \tag{5}$$

As can be see from FIG. 2, $V_T = V_{Ref} + V_M$ and $$V_{Ref} = \frac{K_1}{K_2} V_c$$

such that:

$$\rho = \frac{K}{i_0}\left(V_M + \frac{K_1}{K_2} V_c\right) \tag{6}$$

For simplicity, let $K_1/K_2 = \epsilon$. As such, a resistivity measurement free of the perturbations of the measured survey voltage may be found according to the equation:

$$\rho = \frac{K}{i_0}(V_M + \varepsilon V_c) \tag{7}$$

The value of $\epsilon$ can be determined experimentally for any particular wire line cable. To determine the value of $\epsilon$ prior to downhole insertion of the resistivity tool, preferably connect the N-electrode to the lateral log array so that $V_T = 0$. Because $V_T = V_M + V_{Ref}$ it follows that:

$$0 = V_M + \epsilon V_c$$

And thus, $$\varepsilon = \frac{-V_M}{V_c} \tag{8}$$

Where $V_M$ is the non-zero normal survey voltage measurement. However, normally when $V_T = 0$ it follows that $V_M = 0$. To make $V_M$ non-zero, $V_A$ must be forced to some value. From equation (3), $V_{Ref} = K_1 V_A$ and thus when $V_A$ is forced to some value, $V_M$ also changes to a non-zero value. Preferably, $V_B$ should be connected to the wire line armor. This forces $V_B = V_A \neq 0$. The corrected measurements of equations (7) and (8) can be performed automatically as the laterolog array is pulled upwards through the earth formations and wellbore. These calculations automatically correct for changes in $V_M$, $V_B$, and $V_A$ due to bore hole diameter, mud resistivity or formation resistivity changes.

Changes in $\epsilon$ can also occur should the wire line cable capacitance and/or resistance change. Often the value of $\epsilon$ may change depending upon the temperature downhole. The value of $\epsilon$ should thus be determined for any particular length and type of cable and can be modified to reflect any change in the cable characteristics such as temperature dependence of the cable resistance. As such, a functional relationship between temperature and $\Delta\epsilon$ can be developed either experimentally or through mathematical modeling.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. For example, the armor voltage may be measured at other locations along the wireline's length. Accordingly, the scope of protection is not limited to the embodiments described herein, but is only limited by the claims which follow, the scope of which shall include all equivalents of the subject matter of the claims.

What is claimed is:

1. A resistivity tool configured for use in a borehole, and configured for attachment to a wireline conductor with armor, comprising:
    a current source;
    a laterolog array connected to said current source;
    a return electrode connected to said laterolog array;
    a first measurement amplifier connected to said laterolog array and configured to measure a voltage between said laterolog array and a reference voltage; and
    a second measurement amplifier configured for connection to said armor, said second measurement amplifier configured to measure a voltage between said armor and said reference voltage.

2. The resistivity tool of claim 1, wherein said armor has a first end and said second measurement amplifier measures said voltage between said armor and said reference voltage from said first end of said armor.

3. The resistivity tool of claim 2, wherein said reference voltage is taken from said wireline conductor at a point corresponding to said first end of said armor.

4. A resistivity logging system comprising:
    a current source suitable for insertion in a wellbore;
    a return electrode configured for connection to said current source;
    a reference electrode configured for connection to said current source and suitable for placement at a location outside said wellbore;

a first comparator suitable for connection to said current source, said first comparator suitable to generate a survey voltage dependent upon a potential drop between said current source and a reference voltage;

a second comparator suitable to generate a correction voltage to measure a potential drop between said reference voltage and a first voltage;

a processor to compute resistivity based on said survey voltage and said correction voltage.

5. The resistivity logging system of claim 4, wherein said first voltage corresponds to wireline armor voltage.

6. The resistivity logging system of claim 4, wherein said resistivity logging system is suitable for attachment to an armored communication line having a first end, said first voltage being a voltage at said first end of said armored communication line.

7. The resistivity logging system of claim 4, wherein said processor determines resistivity based on the equation:

$$\rho = K\left(\frac{V_T - V_{Ref}}{i_0}\right)$$

where

ρ=resistivity;

K=resistivity constant (correction factor);

$i_0$=survey current;

$V_T$=voltage at said current source;

$V_{Ref}$=said reference voltage at a location on a wireline.

8. A method of operating a resistivity tool comprising:
(a) electrically connecting a laterolog array of said resistivity tool and a reference electrode of said resistivity tool such that the voltage at said laterolog array equals zero, said resistivity tool further comprising a wireline connection between said laterolog array and said reference electrode, said wireline having armor along at least a portion of its length, a first comparator attached to said laterolog array and a first point located along said wireline, said first comparator providing a first output, a second comparator attached proximate to said first point and to a second point located along said armor, and said second comparator providing a second output;

(b) applying a voltage to said second point;

(c) monitoring said first output of said first comparator and said second output of said second comparator.

9. The method of claim 8, further comprising:

(d) placing said laterolog array and an attached return electrode in a wellbore surrounded by a formation;

(e) computing the resistivity of said formation based on the result of step (c) and further monitoring of said first and second outputs.

10. The method of claim 9, wherein said computing step is according to the equation:

$$\rho = \frac{K}{i_0}(V_M + \varepsilon V_c)$$

where $V_M$=measured survey voltage between downhole electrode array and surface reference K=correction factor $V_C$=voltage between armor and bottom end of conductor leading to surface reference;

ε=ratio of $V_{ref}/V_c$; and $i_0$=survey current.

11. The method of claim 10, where said method includes measuring the value for ε for said wireline.

12. The method of claim 9, wherein said computing step is a step for computing the resistivity of said formation surrounding said wellbore.

* * * * *